March 11, 1924.
W. J. HAGMAN
1,486,659
ART OF CONNECTING SUBMERGED OBJECTS
Filed March 7, 1919    4 Sheets-Sheet 1
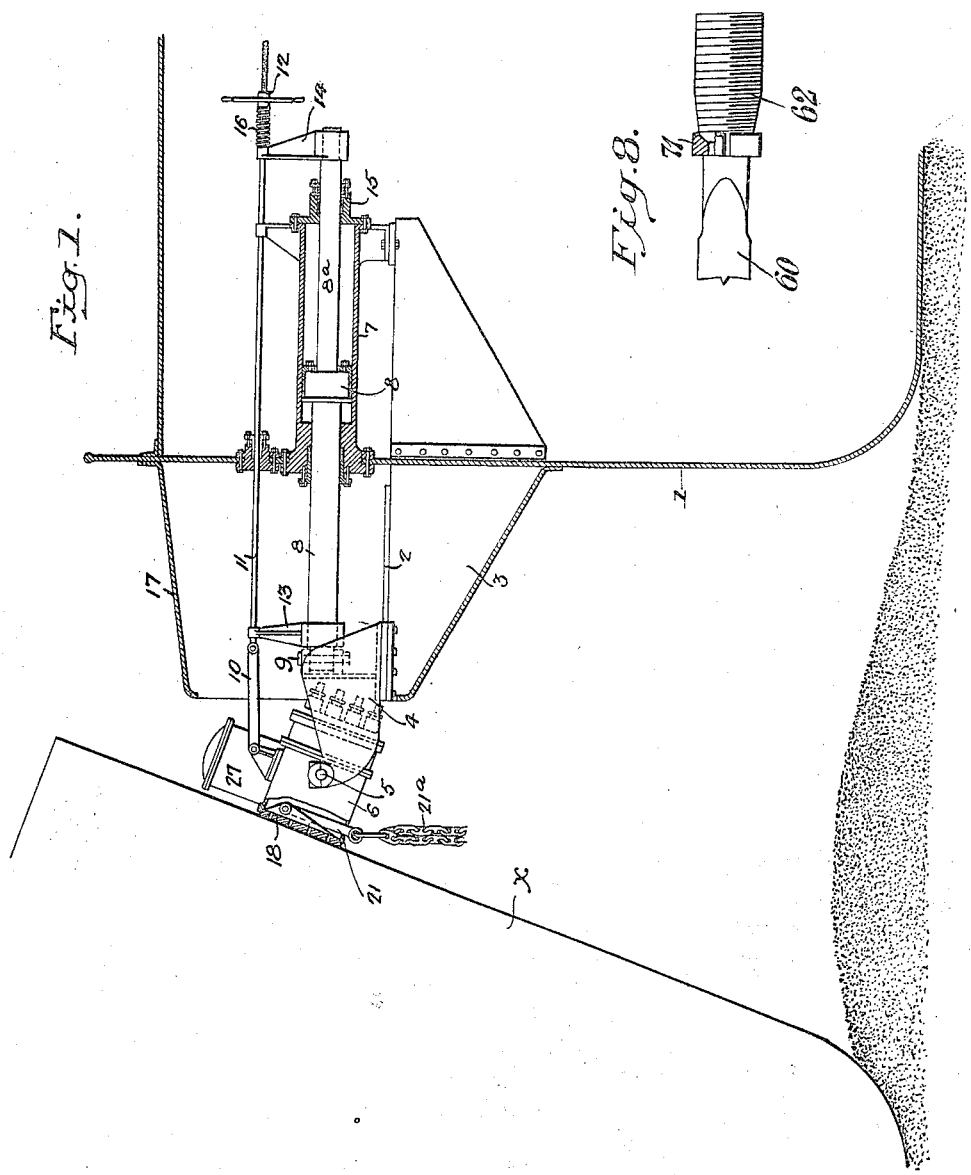
Inventor,
William J. Hagman
By his Attorneys,
Howson & Howson March 11, 1924.
W. J. HAGMAN
1,486,659
ART OF CONNECTING SUBMERGED OBJECTS
Filed March 7, 1919     4 Sheets-Sheet 2
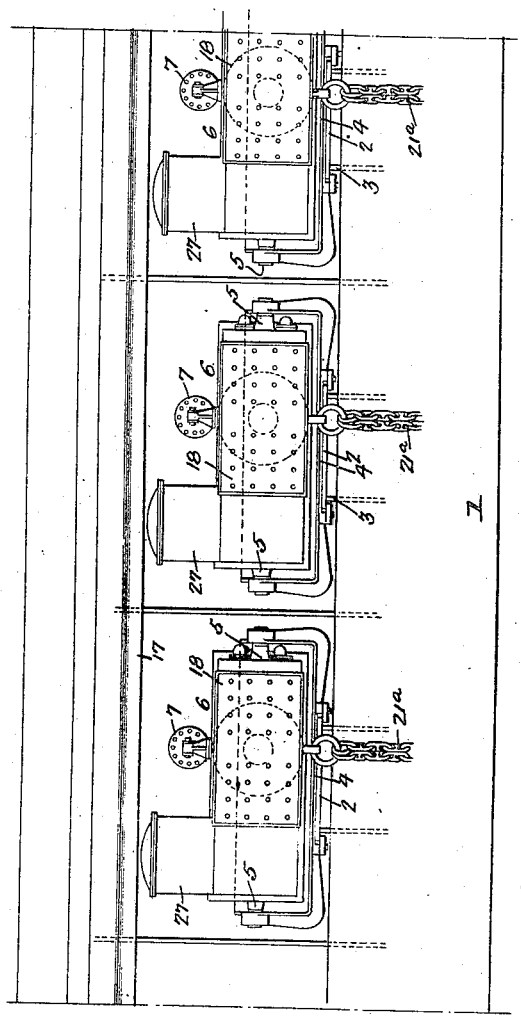
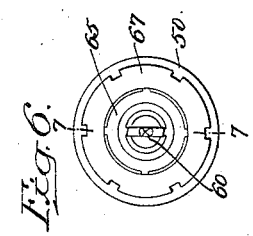
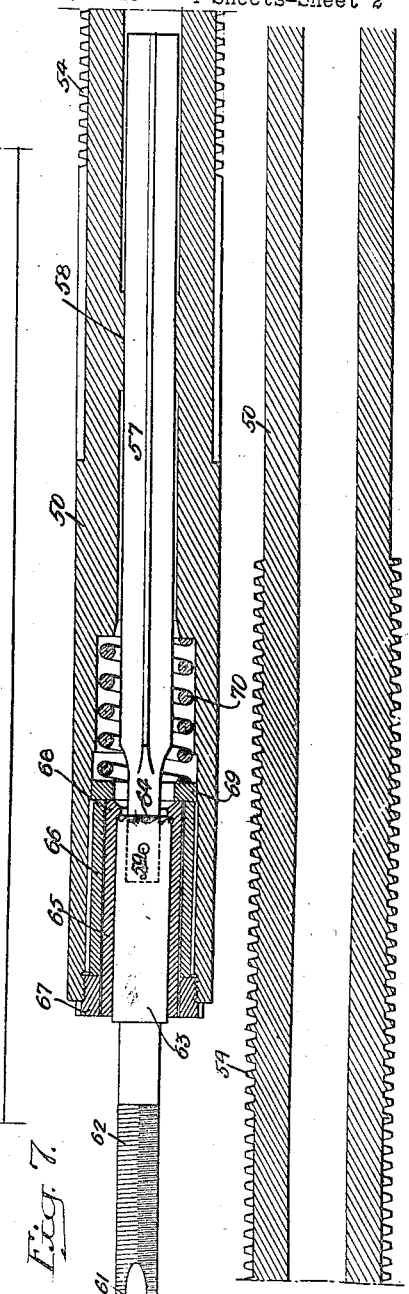

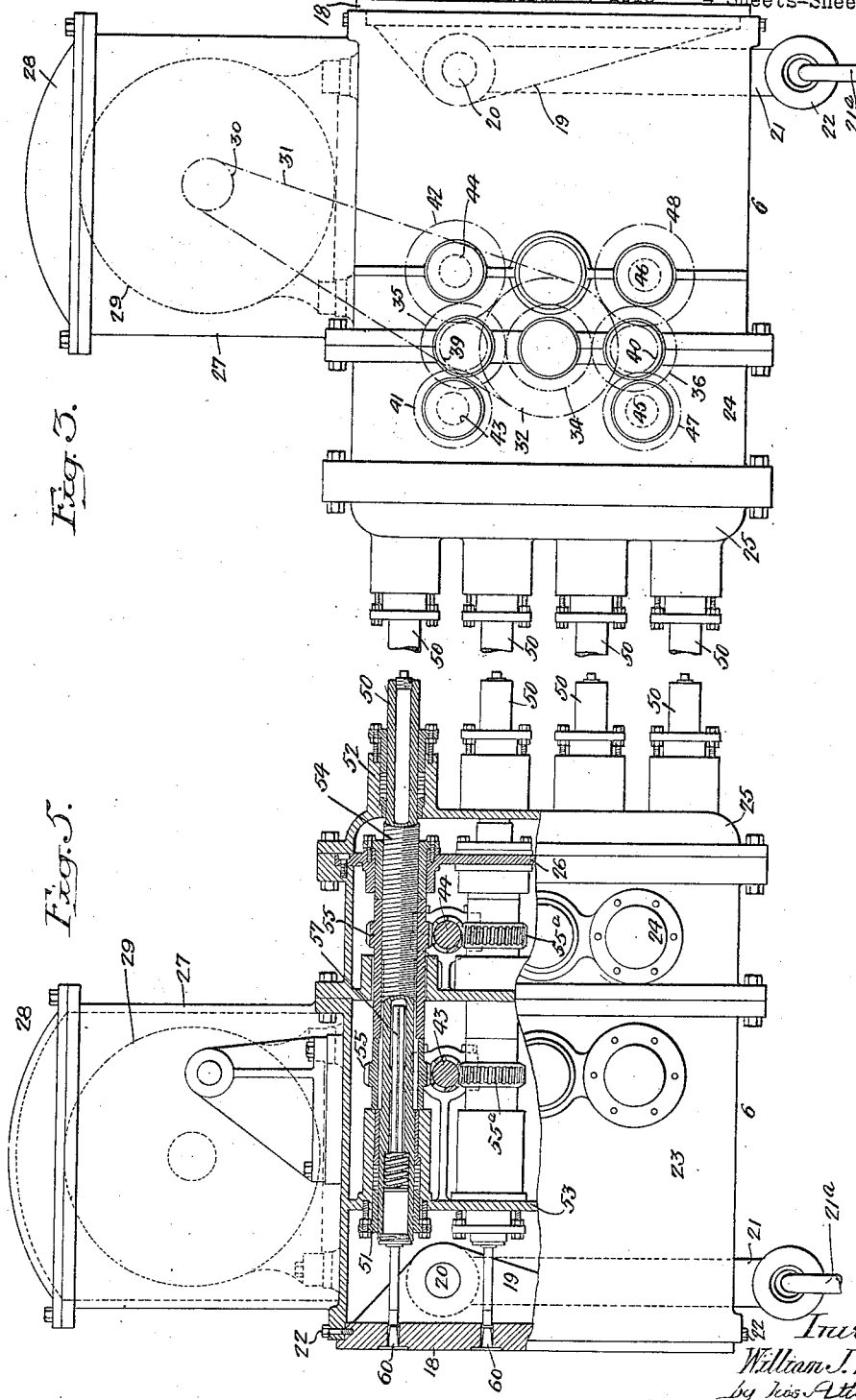

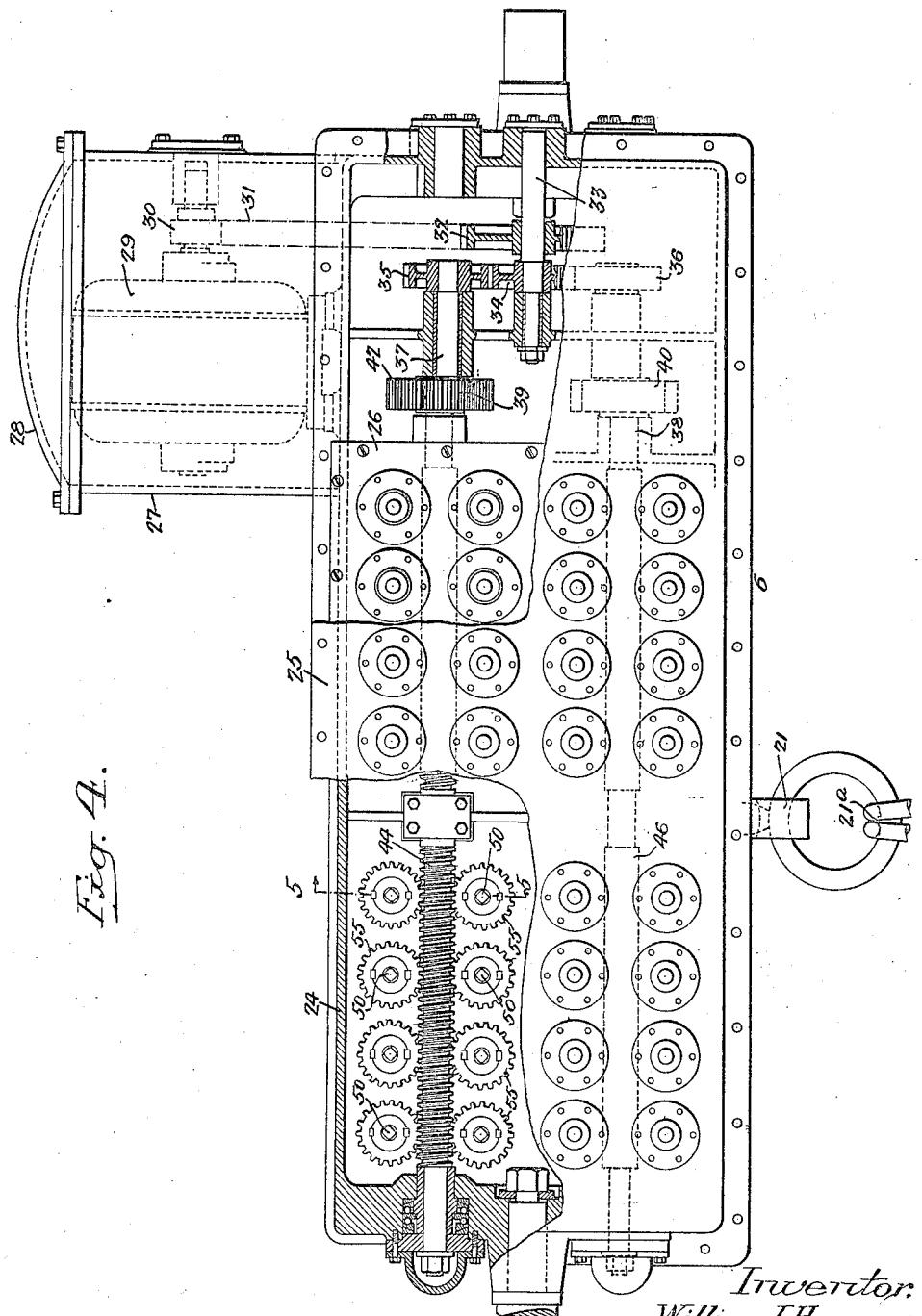

Patented Mar. 11, 1924.

1,486,659

UNITED STATES PATENT OFFICE.

WILLIAM J. HAGMAN, OF PHILADELPHIA, PENNSYLVANIA.

ART OF CONNECTING SUBMERGED OBJECTS.

Application filed March 7, 1919. Serial No. 281,257.

*To all whom it may concern:*

Be it known that I, WILLIAM J. HAGMAN, a citizen of the United States, residing in Philadelphia, Pennsylvania, have invented the Art of Connecting Submerged Objects, of which the following is a specification.

In raising objects such as sunken vessels from relatively great depths, i. e.,—in excess of one hundred and fifty feet, for example, one of the serious problems encountered arises from the difficulty of attaching chains or cables through which such lifting or movement of the vessels may be accomplished. Obviously at such depths the water pressure is so great that divers cannot be employed nor for the same reason, is it possible to utilize the apparatus hitherto available for use in relatively shallow waters where the pressures are lower.

One object of my invention therefore is to provide an automatically acting apparatus whereby a series of plates or equivalent structures to which lifting chains or cables are or may be attached, may be rigidly and firmly secured to a submerged object such as a vessel practically regardless of its depth and position in the water;—said invention contemplating mechanical means especially designed for use in connection with a submersible boat, for so drilling holes, tapping the same, and thereafter inserting bolts or studs in an object such as a vessel sunk to a depth not attainable by submarine divers, as to attach thereto plates or equivalent structures whereby it may be lifted or moved.

Another object of my invention is to provide a drilling, tapping and bolt-inserting machine capable of operating in relatively great depths of water, which shall include a novel form of drill, tap and bolt, together with devices whereby it shall be possible to release such bolt from the machine after it has been inserted thereby in a desired submerged object.

My invention also contemplates a novel machine of the type above noted which shall include means for positioning it on or applying it to the object in which it is desired to insert one or more bolts for attaching a plate or other structure.

I also desire to provide a drilling, tapping and bolt-inserting machine with novel means for permitting its continued operation both in the event of the breakage of one or more of a number of drills and also in case said one or more of the drills should foul or stick so that further turning would be impossible.

It is further desired to provide a machine of the above noted type with a novel means for supporting and applying a plate or equivalent structure which it is desired to bolt to a submerged object, whereby after such bolting has been accomplished, it shall be possible for the machine to be separated from the plate.

These objects and other advantageous ends I attain as hereinafter set forth, reference being had to the accompanying drawings, in which, Fig. 1 is a side elevation partly in section and to some extent diagrammatic, illustrating my invention with its associated structures;

Fig. 2 is a side elevation of a portion of the submersible boat illustrated in Fig. 1, showing a series of my machines in position thereon;

Fig. 3 is a side elevation of my machine;

Fig. 4 is a rear elevation, partly in vertical section, with certain portions broken away to illustrate the detail construction of the mechanism;

Fig. 5 is a vertical section on the line 5—5, Fig. 4, further illustrating the detail construction of the machine;

Fig. 6 is a front elevation of one of the drill structures with its supporting spindle;

Fig. 7 is a longitudinal vertical section on the line 7—7, Fig. 6, illustrating the drill structure with its forward end extending within the plate to be attached to the vessel, and, Fig. 8 is an enlarged elevation, partly in section, of the forward portion of the drill structure.

Since most sunken vessels lie in such positions that their sides are inclined more or less to the vertical, as indicated at $x$ in Fig. 1, it is necessary that a drilling machine designed to operate upon the sides of such a vessel shall be adjustable to permit of its application to inclined surfaces. For this purpose the hull of a submersible boat 1 is constructed to provide a supporting structure 3 having a guideway 2 on which a carriage 4 is slidable toward and from said boat. This carriage is provided with bearings for horizontal trunnions 5 whereby my drilling, tapping and bolting machine 6 is so supported as to be free to turn on a substantially horizontal pivot or axis.

For projecting or retracting said carriage with the machine relatively to the boat 1, I provide in the latter any suitable hydraulic air or other power operated mechanism illustrated in the present case as consisting of a cylinder 7 set in the side of the hull, having a piston or plunger 8 whose rod or prolongation extends through a stuffing box and is connected by a vertical pivot 9 to the carriage 4, it being noted that the latter is formed relatively to its guideway in the present case loosely fitting the same (Fig. 2) so as to be free to swing on said pivot to a limited extent in a substantially horizontal plane.

For manually swinging the machine 6 on its trunnions 5 I provide a link 10 and a rod 11 of which the latter extends through a stuffing box in the side of the hull 1 and has its inner end threaded for the reception of a hand wheel or nut 12. The outer end of the rod 11 is supported in a bracket 13 carried by the outer end of the plunger extension 8 while its inner end is similarly carried by a second bracket 14 supported on the inner end of a second plunger extension 8ª which projects into the vessel through the stuffing box 15;—there being a spring 16 confined between the wheel or nut 12 and said bracket 14 in order that the rod 11 may be free to move in order to permit of the machine 6 adjusting itself to the surface of the sunken vessel x when pushed into place on the same. While the submersible boat may have its hull recessed to provide for the reception of the machine 6 and its associated parts when the apparatus is not in operation, I have shown said boat as equipped for this purpose with a casing 17 so designed as to project beyond its vertical side.

The particular machine illustrated is especially designed to apply to a sunken vessel a flat substantially rectangular plate 18 having integral lugs 19 projecting from one face and carrying a pivot pin 20 whereby the link 21 of a chain or cable 21ª is connected to said plate. According to my invention, the mechanism of my machine is mounted within an elongated casing of substantially rectangular cross section, having the plate in question mounted on one of its elongated faces. Said plate is set into said casing where it is removably held by a series of bolts 22 of lead or other structurally weak material which will break under comparatively light stress, as for example when the casing of the machine is pulled bodily away from the plate 18.

The casing itself is preferably, though by no means necessarily, made in three sections, 23, 24 and 25, of which one has one side normally closed by the chain-carrying plate 18 to be attached to the sunken vessel. This same section of the casing has its opposite side closed by the end of the casing section 24 and has a diaphragm or bearing plate 26 clamped between this latter section and the third casing section 25. The first casing section 23 has projecting from its upper side a casing extension 27 including a removable cover 28 and providing an enclosure for an electric motor 29 whereby the mechanism of my apparatus is driven. The armature shaft of this motor is connected by a pinion 30 and a chain belt 31 to a gear 32 mounted on a short shaft 33 carried in suitable bearings at one end of the casing, and this shaft has also fixed to it a second gear 34 meshing with two gears 35 and 36 respectively above and below it. These gears through the shafts 37 and 38 on which they are mounted, drive two other gears 39 and 40. The first of these latter lies between and meshes with two gears 41 and 42 of different diameters, respectively fixed to a pair of parallel worm shafts 43 and 44 mounted in suitable bearings and extending longitudinally of the casing of the machine within the sections 23 and 24 thereof. With the above described arrangement, both of these worm shafts are turned in the same direction but with a predetermined difference of speed in order to advance the drill as hereafter described and in the case illustrated I have provided a second pair of worm shafts 45 and 46 driven from the gear 40 through different diameter gears 47 and 48 respectively.

Any desired number of parallel drill spindles 50 are mounted within the casing of the machine so as to extend perpendicular to the plane of the plate 18 and each of them extends through stuffing boxes 51 and 52 respectively formed in a plate or diaphragm 53 within the casing section 23 and in the section 25, so that the water in which my machine may be submerged is excluded from the casing proper as well as from its motor containing extension 27 if it is desirable so to do.

For operatively connecting these spindles to the source of power provided by the motor and for feeding them longitudinally, I spline to each spindle a sleeve on which is mounted a worm wheel 55ª meshing with the worm shaft 43. Each of the spindles in addition is threaded as indicated at 54 for the reception of a second and internally threaded sleeve having integral with it a second worm wheel 55 meshing with the worm shaft 44. It is noted that the threads of this sleeve and of the spindle are so designed that when both the shafts 43 and 44 are in operation, the spindle is rotated by the first sleeve and would tend to feed longitudinally through the second sleeve at a rate dependent upon the pitch of the thread. Owing however, to the rotation of this threaded sleeve, the rate of this longitudinal feeding is reduced to a predetermined extent, so that under operating conditions the spindle is fed forward at a rate primarily determined by the difference in diameters of the two gears 41 and 42 and the lead of the screw thread on the spindle.

As indicated in Fig. 4, there are a number of pairs of spindles 50 driven from the two worm shafts 43 and 44, and similarly there are a corresponding number of pairs of similar spindles likewise driven from the two worm shafts 45 and 46. Each of these spindles is tubular and has longitudinally slidable within it a shank 57 of other than circular section which fits a correspondingly formed portion 58 so as to be compelled to turn with said spindle. The shank has an end portion of circular section connected by a pin 59 to a bar whose forward portion has the form of a drill 60, back of which it has a tap portion 61, then a threaded portion 62 constituting the body of a bolt and finally an enlarged portion 63 constituting its head. Each of these latter drill-bolt structures is freely movable through a previously formed hole in the plate 18 to be attached to the sunken vessel, and it is noted that the pin 59 whereby said structure is connected to the driving bar 57 is so designed that while it has sufficient strength to transmit the power necessary for driving the drill, for turning the tap during the cutting of threads and for screwing the bolt home, it will shear off under an excessive stress and also in case the drill is fouled or so held that it cannot turn without injury to the rest of the driving mechanism.

The rear end of the bolt head 63 is provided with annular teeth 64 and lies within a soft metal sleeve 65 keyed to but longitudinally slidable through a second sleeve 66 keyed within the cavity of the driving spindle 50 where it is held by a nut 67. The soft metal sleeve 65 has an inwardly projecting thrust flange or shoulder 68 engaging the teeth 64 and it normally rests against a ring or washer 69 between which and a shoulder of the cavity of the spindle 50 is confined a relatively strong coil spring 70. As a result of the above construction the bolt head 63 normally turns with the spindle 50 and with the sleeves 65 and 66, but in the event of the breakage of the pin 59 and such fouling of the drill as would prevent it from turning, the continued rotation of the two sleeves while the spindle continues its forward feed will cause cutting of the shoulder 68 by the teeth 64 and sliding of the shank 57 and drill into the spindle 50.

Between the drill and tap portions 60 and 61 of the bolt structure I provide a shoulder and mount on said drill adjacent the same a split ring 71 of such structural strength that when forced against a fixed object such as a ship's plate through which the drill 60 has passed, it will resist further forward feed of the shank 57 until the spring 70 has been compressed to a predetermined extent, after which it will spread or break, permitting said shank to move violently forward under the action of said spring and thereafter force the tap to take hold.

Under conditions of use the plate 18 is mounted in the open side of the casing of my machine where it is temporarily held by steel or strong bolts (not shown). Before the machine is to be put in operation, the strong bolts are replaced by lead or other relatively weak bolts 22 and said machine is drawn into its casing 17 by admitting fluid under pressure to the cylinder 7. The submersible boat is then sunk to the bottom until it occupies a position adjacent and substantially parallel to the line of the sunken vessel $x$ to be operated upon;—it being understood that the electric motor in the compartment 27 of the casing is connected through suitable conductors to the interior of said boat, which is equipped with suitable electric switches and the necessary current indicating instruments as well as with an electrical comptometer for showing the speed of the driving motor. The operation of said motor and of the machine actuated thereby may thus be carefully observed and controlled from within the submersible boat, although as such connections and apparatus are well known to the art I have not illustrated them.

By thereafter admitting fluid under pressure to the rear or inner end of the cylinder 7, the carriage 4 with the machine 6 is run out on its guideway 2 until the plate 18 strikes the side of the sunken vessel $x$. If this latter occupies the inclined position shown in the drawings, the machine 6 is swung on its trunnions by operation of the rod 11 through the hand wheel 12 and as the carriage continues to be forced outward by the action of the fluid in the cylinder 7, the plate 18 is caused to become practically parallel with or closely engage the side of the vessel;—the rod 11 permitting a final adjustment to occur automatically by reason of the yielding of its spring 16.

If now the controlling switches be closed so that said motor is put in operation, power is transmitted to the worm shafts 43—46 which at once rotate and feed all of the spindles 50 outwardly, causing the drills to be fed through the plate 18.

In the case illustrated the machine is so designed as to cause the spindles to make twenty-five revolutions per minute, and as they feed outwardly the drill portions 60 will cut into and form holes in the plates of the ship against which the plate 18 is forcibly maintained to effect the necessary pressure required for the drilling, by means of the fluid under pressure in the cylinder 7. Under ordinary conditions all or a majority of the drills will shortly complete and pass through these steel plates of the vessel x and the outward or forward feeding of the spindles will continue until their split rings 71 engage the outer surface of said plates. The further feeding of said spindles will then cause the shank 50 of each of them to compress its spring 70 until, when such compression is complete, the stress upon the ring is sufficient to split or break it, whereupon the quick expansion of the spring causes the shank 50 to suddenly move forward, compelling the entering portion of the tap 61 to bite into the walls of the hole formed by the drill so that the continued rotation of the spindle and additional spring pressure causes said tap to force itself into the hole, with a resulting forward movement of the shank greater than that due to the feed. This operation of the tap thus cuts a thread in the walls of the hole in the ship's plate and thereafter the thread portion 62 of the bolt is likewise entered and screwed into said hole, until finally the head 63 strikes the outside surface of the plate 18. When this occurs, further rotation of the bolt is impossible and the pin 59 is immediately sheared off. Thereafter the continued forward feed of the spindle is not interfered with up to its limit of travel as the bolts sent home have advanced to positions forward of the spindle.

If one of the drills should break during the operation of its spindle so that its further forward movement was impossible, while it continued to revolve with the spindle sooner or later the bolt head would shear off the flange 68 of the soft metal sleeve 65. Similarly if the drill should become fouled or stick and cease to turn, injury to the apparatus would likewise be prevented and the forward feed of the spindle permitted to continue by the cutting through of the flange 68 by the teeth 64 in the bolt head.

Since the current taken by the motor will be different when the drills are cutting and when they are running idle, and also when the bolts are being screwed up, an operator in the submersible boat or at any other point is enabled to determine when the drilling operation has been completed and when all of the bolts have been set up and cut loose from their driving spindles. When this latter operation has taken place he so admits fluid to the cylinder 7 as to forcibly draw the machine 6 away from the sunken vessel x, with the result that the weak bolts 22 are sheared off and the plate 18 is left in position against the side of such vessel where it is rigidly held by all of those bolts which have been inserted and screwed up by the machine.

If desired, as indicated in Fig. 2, the submersible boat 1 may be equipped with a plurality of my machines in order that a number of plates may be simultaneously applied to the sunken vessel, after which said boat may be taken to the surface and a new plate inserted in the open side of each of its machines 6. Obviously any desired number of additional plates may thus be attached to the sunken vessel, their chains being attached previously or later to pontoons, submersible boats or other approved means for lifting or moving a sunken vessel.

From the above description it will be seen that I have provided an apparatus which, while controlled from the interior of a submersible boat or vessel or from any other convenient point, is caused to automatically operate to drill and tap one or any number of holes in a submerged structure and thereafter to insert a bolt in each of the holes by utilizing an element which includes drilling, tapping and bolting portions. By operating such element or elements through a plate or equivalent member, it is thus possible to firmly secure the latter to the submerged object.

In addition I have provided means whereby injury to the machine is prevented even though one or more of the drills should break or become fouled and have so mounted the plate to be attached to the sunken vessel that it is readily detachable from the machine after it has been bolted in place on the submerged object. The apparatus as a whole is operable at any depth to which it may be taken and in addition to being of relatively simple and substantial construction, is relatively inexpensive to build and operate.

I claim:

1. The combination with a submersible boat of a plate attaching machine; mechanism carried by the boat for projecting said machine at will into engagement with an adjacent submerged object; with means in addition to the projecting mechanism for adjusting the position of said machine from within the boat.

2. The combination in a submersible boat of a plate attaching machine; a carriage for said machine movably supported by the boat and power actuated means for projecting and retracting the carriage with the machine at will.

3. The combination with a submersible boat of a plate-attaching machine carried by and wholly outside the same; and means operative against the action of water pressure external to the boat, for forcibly projecting said machine as a unit away from the boat.

4. The combination in a submersible boat of a plate-attaching machine supported thereby; means operative against the action of water pressure external to the boat for forcibly projecting said machine as a unit away from the boat; and other means for adjusting the position of the machine relatively to the submerged object.

5. The combination with a submerged boat of a carriage outside of the boat and movably supported thereby; a plate attaching machine trunnioned on said carriage; and means for projecting and retracting the carriage at will.

6. The combination with a submerged boat of a carriage outside of the boat and movably supported thereby; a plate attaching machine trunnioned on said carriage; means for projecting and retracting the carriage at will; with means within the boat for swinging the machine on its trunnions.

7. The combination with a submerged boat of a carriage outside of and supported by the boat and movable toward and from said boat; and means for forcibly moving the carriage connected thereto to permit of a limited horizontal movement of said carriage; and a plate attaching machine trunnioned on the carriage.

8. The combination with a submersible boat of a plate attaching machine; means carried by and outside of the boat for supporting the machine; with a device for adjusting the position of the machine relatively to its supporting means, said machine being free to automatically adjust itself on said supporting means to a limited extent under predetermined conditions.

9. The combination with a submersible boat of a hydraulic machine having a movable element projecting through the side of the boat; and a plate attaching machine mounted on said element outside of the boat.

10. The combination with a submersible boat of a carriage movably supported by and outside of said boat; a plate attaching machine trunnioned on said carriage; means for projecting and retracting the carriage at will; with means permitting limited movement of the machine on an axis substantially at right angles to that of the trunnions.

11. The combination of a submersible boat having a casing; a plate applying machine outside of the boat; and means operative from within the boat for projecting said machine from said casing or retracting it into the same at will.

12. The combination of a submersible boat having an external guideway; a cylinder and piston within the boat, a carriage movably mounted on the guideway and operatively connected to said piston; with a plate attaching machine mounted on the carriage.

13. The combination in a plate applying machine of a water tight casing; a motor therein; a plurality of parallel drills longitudinally movable out of the casing making water tight connections therewith; and mechanism in the casing for driving the drills from the motor; with automatic devices for independently disconnecting the drills from the motor under predetermined conditions of operation.

14. A new article of manufacture consisting of a bar having a head at one end and a bolt thread adjacent said head, a drill at the opposite end of said bar, and a tap between said drill and said bolt threads; with cutting teeth for the head of said bar.

15. A new article of manufacture consisting of a bar having a tap portion and a drill portion; a shoulder between said two portions; and a removable ring mounted on said bar adjacent the shoulder.

16. A new article of manufacture consisting of a bar including a head at one end, bolt threads, a tapping portion, a drill portion at its second end, and a shoulder between said tap portion and drill portions; with a yieldable ring mounted between the shoulder and the drill portion.

17. The combination of a driving spindle; a bolt; and a structurally weak member separably connecting said spindle and said bolt.

18. The combination of a driving spindle; a drill; and a structurally weak element connecting said spindle and said drill.

19. The combination of a bolt having a cutting drill at one end; a driving spindle for said bolt; and a structurally weak member separably connecting said bolt and said spindle.

20. The combination of a driving spindle; means for longitudinally feeding the same; a drill actuated by said spindle; and means for automatically freeing the spindle from the drill if the latter ceases to cut or advance during the feeding operation of said spindle, the same consisting of a structurally weak element and teeth for cutting through said element.

21. The combination of a tubular driving spindle; a shank longitudinally slidable through and rotatable with said spindle; a drill connected to said shank and having cutting teeth; means for feeding the spindle; and a member for transmitting longitudinal movement from the spindle to the drill having a portion placed to be cut by the teeth when relative movement occurs between the drill and the spindle.

22. The combination with a rotatable and longitudinally movable driving spindle; a combined drill and tap mounted therein; and means for temporarily preventing longitudinal movement of the drill after it has cut a hole and thereafter suddenly releasing it to cause biting of the tap.

23. The combination with a rotatable and longitudinally movable driving spindle; a combined drill and tap mounted therein; and means for temporarily preventing longitudinal movement of the drill after it has cut a hole and thereafter suddenly releasing it to cause biting of the tap, the same consisting of means for temporarily arresting longitudinal movement of the drill-tap; and a spring for forcibly moving the latter when the arresting means ceases to act.

24. The combination of a longitudinally movable and rotatable driving spindle; a combined drill and tap actuated thereby; a spring mounted between the drill-tap and the spindle; with a ring normally preventing longitudinal movement of the drill-tap, said ring being yieldable to permit forcible movement of the drill-tap and biting of the tap under the action of the spring.

25. The combination of a device for holding a plate against a sunken vessel; a combined drill and bolt operative through the plate; a machine for actuating said drill bolt; and means for causing said bolt to automatically cut itself loose from the machine under predetermined conditions.

26. The combination of a device for holding a plate against a sunken vessel; a series of combined drills and bolts operative through the plate; a machine operatively connected to the drill bolts for causing them to simultaneously operate through the plate to form and enter holes in the vessel; and means for automatically cutting said bolts loose from the machine under predetermined conditions.

27. The combination in a plate attaching machine of a plurality of drill spindles; a drill bolt for each of said spindles; means for supporting a plate in position to receive said drill bolts as they are actuated by the machine; with means for automatically cutting loose any fouled bolt or bolts independently of the others, without affecting the same.

28. The combination of a machine for applying a plate to a submerged object including means for separably engaging the plate; and mechanism for bolting said plate to said object, said applying machine including mechanism for forcibly separating it from the plate after the latter has been bolted into position.

29. The combination of means for applying a structure to a submerged object, mechanism for simultaneously inserting a plurality of bolts through said structure into said object; with means for automatically disconnecting the bolts from the mechanism when they have been set up.

30. The combination in a drilling and bolting machine of a bar having a drill portion and a tap portion; means for rotating said bar and feeding it longitudinally; and a device for temporarily changing the rate of longitudinal feed of said bar after it has drilled a hole and before it has tapped it.

31. The combination of a rotary drill spindle; a combined drill and tap member; means for longitudinally moving and rotating said spindle; and a yieldable connection between the spindle and its combined drill and tap.

32. The combination in a drilling and bolting machine of a bar having a drill portion and a tap portion; means for rotating said bar and feeding it longitudinally, including a yielding connection; and a device for temporarily arresting the longitudinal feed of said bar and thereafter permitting it to move at an increased speed for a limited distance.

33. The combination in a drilling and bolting machine of a bar having a drill portion and a tap portion; means including a yielding connection for rotating said bar and feeding it longitudinally; and a device positioned to temporarily arrest longitudinal movement of the bar after it has drilled a hole, said yielding connection including means for causing longitudinal feed of the bar at an increased speed after such arresting of its movement.

34. The combination in a drilling and bolting machine of a bar having a drill portion and a tap portion; means including a spring, for rotating the bar and feeding it longitudinally; a split yieldable ring positioned to temporarily arrest movement of the bar after it has drilled a hole and designed to yield after said spring has been compressed to a predetermined extent.

35. In a device for salvaging sunken vessels, the combination of a plate attaching machine; a support for said machine; and means on said support for projecting and adjusting said machine relative to said vessels.

36. In a ship salvaging apparatus, the combination of a plate attaching machine; a carriage for said machine; a support for said carriage; means on said support for projecting and retracting said carriage; and means for adjusting the position of said machine relative to said support.

In witness whereof I affix my signature.

WILLIAM J. HAGMAN.